United States Patent
Heo et al.

(10) Patent No.: US 11,899,789 B2
(45) Date of Patent: Feb. 13, 2024

(54) LOW VOLTAGE ATTACK DETECTOR, SECURE ELEMENT AND ELECTRONIC SYSTEM INCLUDING THE SAME

(71) Applicant: Samsung Electronics Co., Ltd., Suwon-si (KR)

(72) Inventors: Donghun Heo, Hwaseong-si (KR); Kwangho Kim, Yongin-si (KR); Junhyeok Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 292 days.

(21) Appl. No.: 17/470,875

(22) Filed: Sep. 9, 2021

(65) Prior Publication Data

US 2022/0222339 A1    Jul. 14, 2022

(30) Foreign Application Priority Data

Jan. 14, 2021    (KR) .................. 10-2021-0005408

(51) Int. Cl.
| | |
|---|---|
| *G06F 21/55* | (2013.01) |
| *H03K 19/20* | (2006.01) |
| *G05F 1/56* | (2006.01) |
| *G01R 19/00* | (2006.01) |
| *G01R 19/165* | (2006.01) |

(52) U.S. Cl.
CPC ....... *G06F 21/554* (2013.01); *G01R 19/0084* (2013.01); *G01R 19/165* (2013.01); *G05F 1/56* (2013.01); *H03K 19/20* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,440,254 A | 8/1995 | Sundby | |
| 6,882,199 B2 | 4/2005 | Sugimura | |
| 8,754,680 B2 | 6/2014 | Xiao et al. | |
| 8,766,679 B1 | 7/2014 | Paek et al. | |
| 9,442,184 B2* | 9/2016 | Gehrels | G01S 7/40 |
| 10,435,030 B2* | 10/2019 | Vaucher | G01R 31/005 |
| 10,608,619 B1* | 3/2020 | Wang | H03K 3/037 |
| 10,965,262 B2* | 3/2021 | Danioni | H04R 19/04 |
| 11,022,991 B2* | 6/2021 | Motz | G05F 1/571 |
| 2003/0122590 A1 | 7/2003 | O | |

FOREIGN PATENT DOCUMENTS

| | | |
|---|---|---|
| JP | 5062184 B2 | 10/2012 |
| JP | 5860644 B2 | 2/2016 |

* cited by examiner

*Primary Examiner* — Kenneth B Wells
(74) *Attorney, Agent, or Firm* — Muir Patent Law, PLLC

(57) ABSTRACT

A low voltage attack detector includes: a low voltage detector configured to output a low voltage detection flag signal having a high level when a first power supply voltage reaches a first voltage level using a bandgap reference (BGR) circuit including a PMOS transistor and a first bipolar junction transistor (BJT) connected in series between the first power supply voltage and a second power supply voltage; a BGR operation region detector configured to output a malfunction detection flag signal having a high level when the first power supply voltage reaches a second voltage level lower than the first voltage level; and a logic gate configured to output a final low voltage detection flag signal having a high level when at least one of the low voltage detection flag signal and the malfunction detection flag signal has a high level.

14 Claims, 13 Drawing Sheets

LOW VOLTAGE ATTACK DETECTOR, SECURE ELEMENT AND ELECTRONIC SYSTEM INCLUDING THE SAME

CROSS-REFERENCE TO RELATED APPLICATION(S)

This application claims benefit of priority to Korean Patent Application No. 10-2021-0005408 filed on Jan. 14, 2021 in the Korean Intellectual Property Office, the disclosure of which is incorporated herein by reference in its entirety.

BACKGROUND

The present inventive concept relates to a low voltage attack detector.

Various types of hardware security system have been developed to prevent hacking accidents caused by physical attacks of semiconductor chips. However, even in the case of semiconductor chips to which a hardware security system is applied, information inside a security chip may be exposed by various physical attacks.

A semi-invasive attack, among the physical attacks on a semiconductor chip, refers to an attack method of injecting an error without direct physical access to a chip and analyzing a resultant malfunction. Among the semi-invasive attacks, there is a method of causing an error by abnormally changing a voltage, and in order to prevent the same, a device that may detect an occurrence of an abnormal operating environment would be beneficial.

SUMMARY

An aspect of the present inventive concept is to provide a low voltage attack detector maintaining a level of a low voltage detection flag signal when a power supply voltage is lowered to a voltage level in a voltage region in which an analog circuit malfunctions.

According to an aspect of the present inventive concept, a low voltage attack detector includes: a low voltage detector configured to output a low voltage detection flag signal having a high level when a first power supply voltage reaches a first voltage level using a bandgap reference (BGR) circuit including a PMOS transistor and a first bipolar junction transistor (BJT) connected in series between the first power supply voltage and a second power supply voltage; a BGR operation region detector configured to output a malfunction detection flag signal having a high level when the first power supply voltage reaches a second voltage level lower than the first voltage level; and a logic gate configured to output a final low voltage detection flag signal having a high level when at least one of the low voltage detection flag signal and the malfunction detection flag signal has a high level.

According to an aspect of the present inventive concept, a low voltage attack detector includes: a low voltage detector configured to detect whether a first power supply voltage reaches a first voltage level using a bandgap reference (BGR) circuit in a first reliability region in which the first power supply voltage belongs to a first range, and output a low voltage detection flag signal having a high level when the first power supply voltage reaches the first voltage level; a BGR operation region detector configured to output a malfunction detection flag signal having a high level in a second reliability region in which the first power supply voltage belongs to a second range different from the first range; and a power on reset (POR) circuit configured to output a first POR signal having a low level in a third reliability region in which the first power supply voltage belongs to a third range different from the first range and the second range. Each voltage level belonging to the first range is greater than each voltage level belonging to the second range, and each voltage level belonging to the second range is greater than each voltage level belonging to the first range.

According to an aspect of the present inventive concept, a low voltage attack detector includes: a bandgap reference (BGR) operation region detector configured to detect a decrease in a first power supply voltage, wherein the BGR operation region detector may include: a first resistor and a bipolar junction transistor (BJT) connected in series between the first power supply voltage and a second power supply voltage; a second resistor and a third resistor connected in series between the first power supply voltage and the second power supply voltage; and a comparator including a first input terminal connected to a first node between the first resistor and the BJT and a second input terminal connected to a second node between the second resistor and the third resistor.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, example embodiments of the present inventive concept will be described with reference to the accompanying drawings.

Figure 1:
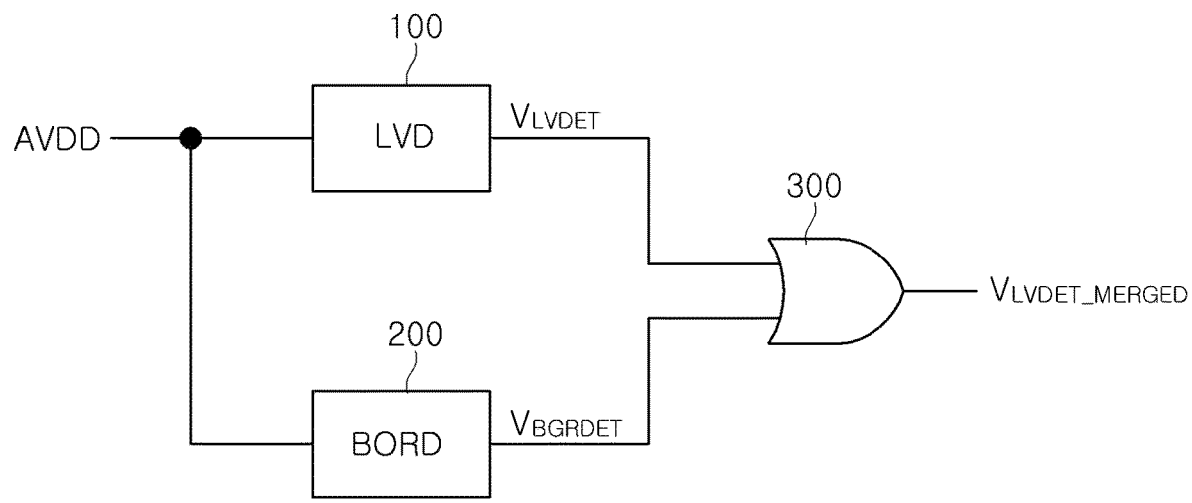
FIG. 1 illustrates a low voltage attack detector according to an embodiment of the present inventive concept.
Figure 2:
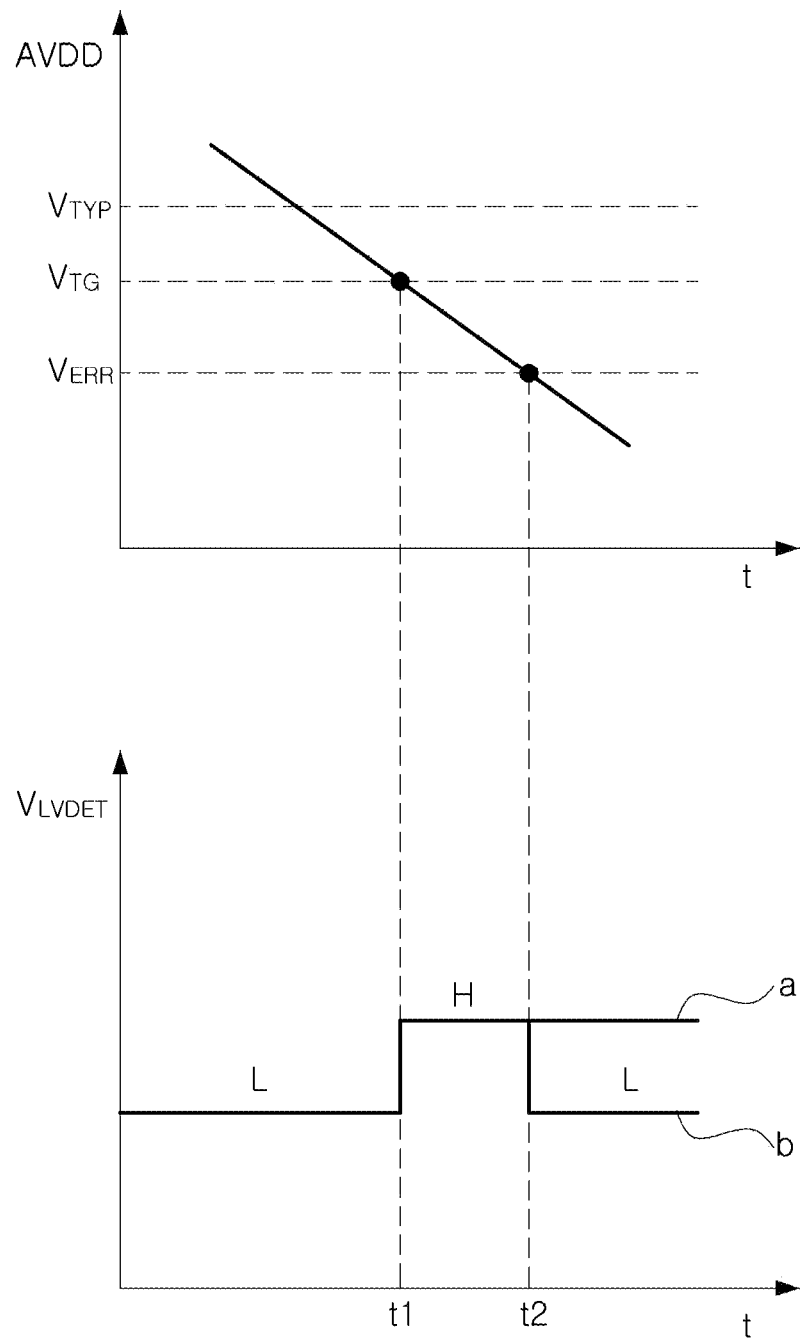
FIG. 2 illustrates operation waveforms of a low voltage attack detector according to an embodiment of the present inventive concept.

FIG. 1 illustrates a low voltage attack detector according to an embodiment of the present inventive concept, and FIG. 2 illustrates operation waveforms of a low voltage attack detector according to an embodiment of the present inventive concept.

Referring to FIGS. 1 and 2 together, a low voltage attack detector 10 may include a low voltage detector (LVD) 100, a bandgap reference (BGR) operation region detector (BORD) 200, and a logic gate 300.

Each of the low voltage detector 100 and the BGR operation region detector 200 may receive a power supply voltage AVDD. The power supply voltage AVDD may be a voltage used to drive an arbitrary electronic device and/or system (hereinafter, referred to as a "system"), and may be, for example, an analog power supply voltage. When the power supply voltage AVDD is lowered to a target voltage $V_{TG}$, the low voltage attack detector 10 may generate a final low voltage detection flag signal and maintain the final low voltage detection flag signal until the power supply voltage AVDD reaches 0V. When the low voltage attack detector 10 informs the system of the final low voltage detection flag signal, the system may be disabled.

The low voltage detector 100 may detect whether the power supply voltage AVDD reaches the target voltage $V_{TG}$, and output a detection result as a low voltage detection flag signal $V_{LVDET}$. The target voltage $V_{TG}$ may refer to a voltage of a region in which various components constituting the system may malfunction. For example, the target voltage $V_{TG}$ may be a voltage lower than a voltage $V_{TYP}$ (e.g., 1.2V) for the system to operate normally.

When the power supply voltage AVDD reaches the target voltage $V_{TG}$ at a time point t1, the low voltage detector 100 may output a low voltage detection flag signal $V_{LVDET}$ having a high level 'H'. The low voltage detection flag signal $V_{LVDET}$ has to be able to maintain the high level 'H' as shown in graph 'a' when the power supply voltage AVDD continues to decrease.

The system may be disabled based on the low voltage detection flag signal $V_{LVDET}$ having the high level 'H'. Therefore, the system cannot operate in an abnormal power supply region and may operate only in a normal power supply region.

The low voltage detector 100 may detect whether the power supply voltage AVDD reaches the target voltage $V_{TG}$ using a reference voltage generated by a BGR circuit. The BGR circuit may be used as a current source or voltage source that generates a reference current or a reference voltage in analog and digital systems. The power supply voltage AVDD of the analog and digital systems tends to gradually decrease due to the development of a process technology, so BGR circuits used in the analog and digital systems have to be able to operate well at low voltages.

Meanwhile, in order for an analog circuit such as an operational amplifier or a comparator to operate normally, a minimum voltage required for a bias circuit of the analog circuit to operate normally has to be applied. For example, a minimum voltage is required for transistors included in the analog circuit to operate normally. However, as the power supply voltage AVDD gradually decreases, the bias circuit of the analog circuit may not operate normally at a malfunction voltage $V_{ERR}$ at a time point t2. That is, if the power supply voltage AVDD is lowered to the malfunction voltage $V_{ERR}$, the analog circuit may malfunction.

When the power supply voltage AVDD in the low voltage detector 100 is lowered to the malfunction voltage $V_{ERR}$, the BGR circuit may malfunction. When the BGR circuit malfunctions, the reference voltage may have an unpredictable value.

If the reference voltage has an unpredictable value, the low voltage detector 100 may not be able to maintain the high level 'H' of the low voltage detection flag signal $V_{LVDET}$ even though the power supply voltage AVDD continues to decrease. As shown in graph 'b', when the power supply voltage AVDD reaches the malfunction voltage $V_{ERR}$ at the time point t2, the low voltage detector 100 may output a low voltage detection flag signal $V_{LVDET}$ having a low level 'L'. The system may be enabled based on the low voltage detection flag signal $V_{LVDET}$ having the low level 'L'. Thus, the system may operate in an abnormal power supply region.

When the low voltage detector 100 is a low voltage detector for preventing hacking, a hacker may hack the system after artificially applying various voltages that may cause malfunction of the analog circuit. Therefore, the low voltage detector 100 has to be able to maintain the low voltage detection flag signal $V_{LVDET}$ at the high level 'H' even at a voltage level in a voltage region in which the analog circuit malfunctions.

When the power supply voltage AVDD is lowered to a voltage level in the voltage region in which the BGR circuit malfunctions, the low voltage attack detector 10 according to an embodiment of the present inventive concept may output a malfunction detection flag signal $V_{BGRDET}$ having a high level in advance using the BGR operation region detector 200 before the BGR circuit malfunctions. Therefore, even if the BGR circuit malfunctions, since the BGR operation region detector 200 generates the malfunction detection flag signal $V_{BGRDET}$ having a high level, the same effect as maintaining the high level of the low voltage detection flag signal $V_{LVDET}$ may be obtained.

The logic gate 300 may receive the low voltage detection flag signal $V_{LVDET}$ from the low voltage detector 100 and the malfunction detection flag signal $V_{BGRDET}$ from the BGR operation region detector 200. When the power supply voltage AVDD reaches the target voltage $V_{TG}$, the low voltage detection flag signal $V_{LVDET}$ may have a high level, and when the power supply voltage AVDD decreases to the malfunction voltage $V_{ERR}$, the low voltage detection flag signal $V_{LVDET}$ may have a low level and the malfunction detection flag signal $V_{BGRDET}$ may have a high level. When the logic gate 300 is an OR gate, the logic gate 300 may perform an OR operation on the low voltage detection flag signal $V_{LVDET}$ and the malfunction detection flag signal $V_{BGRDET}$. When at least one of the low voltage detection flag signal $V_{LVDET}$ and the malfunction detection flag signal $V_{BGRDET}$ has a high level, the logic gate 300 may output a final low voltage detection flag signal $V_{LVDET\_MERGED}$ having a high level.

When the low voltage attack detector 10 informs the system of the final low voltage detection flag signal $V_{LVDET\_MERGED}$ of the high level, the system may be disabled. For example, when at least one of the low voltage detection flag signal $V_{LVDET}$ and the malfunction detection flag signal $V_{BGRDET}$ has a high level, the system does not operate. Therefore, even if the BGR circuit malfunctions, the same effect as maintaining the high level of the low voltage detection flag signal $V_{LVDET}$ may be obtained.

Figure 3:
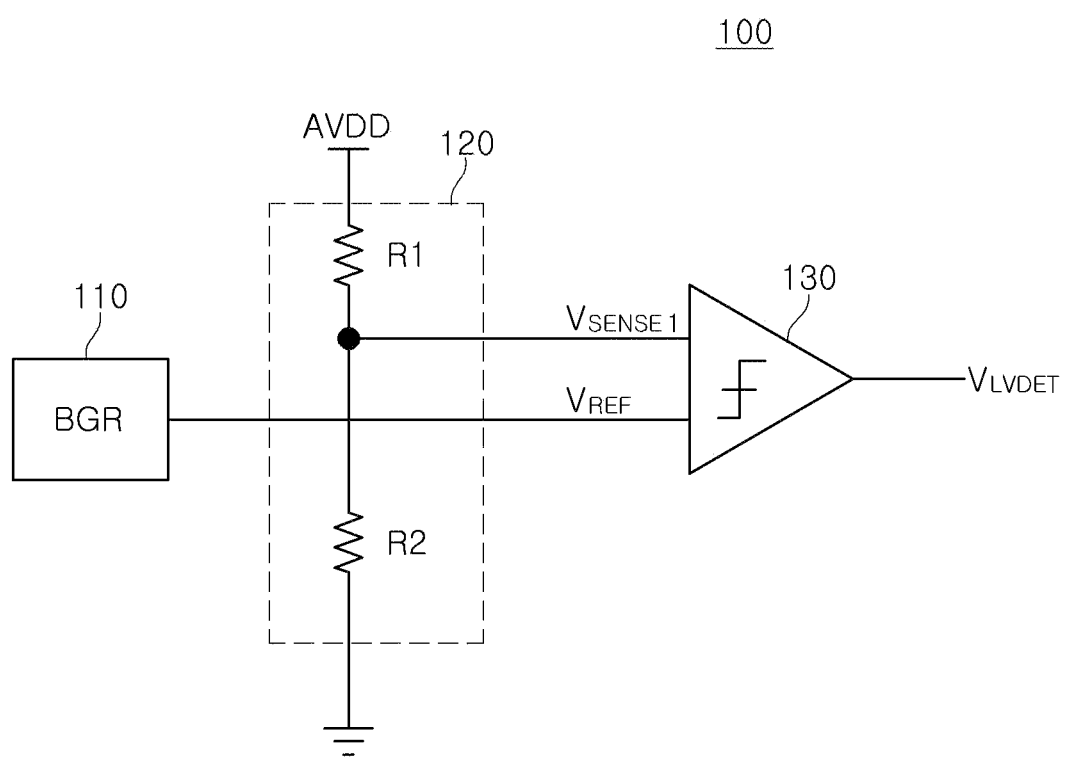
FIG. 3 is a diagram schematically illustrating a low voltage detector according to an embodiment of the present inventive concept.

FIG. 3 is a diagram illustrating a simplified low voltage detector according to an embodiment of the present inventive concept.

Referring to FIG. 3, the low voltage detector 100 according to an embodiment of the present inventive concept may include a BGR circuit 110, a first power supply voltage detection circuit 120, and a comparator 130. The BGR circuit 110 may generate a reference voltage $V_{REF}$ having a stable level regardless of a process-voltage-temperature (PVT) fluctuation.

The first power supply voltage detection circuit 120 may generate a first detection voltage $V_{SENSE1}$ from the power supply voltage AVDD. For example, the first power supply voltage detection circuit 120 may include a first resistor R1 and a second resistor R2 connected in series between the power supply voltage AVDD and a ground voltage, and generate a first detection voltage $V_{SENSE1}$ by resistance-dividing the power supply voltage AVDD. The power supply voltage AVDD may be defined as a first power supply voltage, and the ground voltage may be defined as a second power supply voltage.

The comparator 130 may receive a detection voltage $V_{SENSE1}$ from the first power supply voltage detection circuit 120 and may receive a reference voltage $V_{REF}$ from the BGR circuit 110. The comparator 130 may compare the first detection voltage $V_{SENSE1}$ to the reference voltage $V_{REF}$, and when the first detection voltage $V_{SENSE1}$ reaches the reference voltage $V_{REF}$, the comparator 130 may output a low voltage detection flag signal $V_{LVDET}$ having a high level.

For example, when the power supply voltage AVDD is too low, the BGR circuit 110 cannot operate normally. When a hacker artificially applies a voltage that may cause malfunction of the BGR circuit 110, the reference voltage $V_{REF}$ generated by the BGR circuit 110 may have an unpredictable value. Therefore, a normal operation of the low voltage detector 100 cannot be guaranteed.

Figure 4:
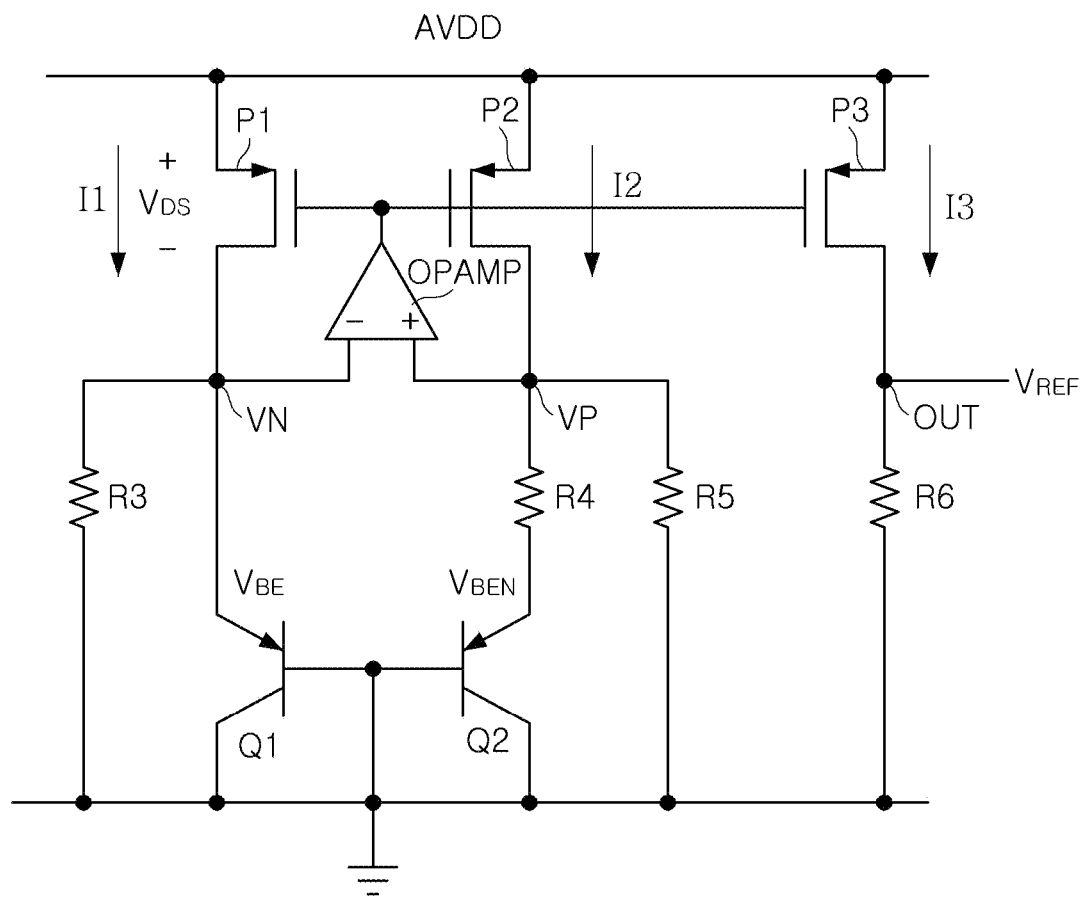
FIG. 4 illustrates a bandgap reference (BGR) circuit according to an embodiment of the present inventive concept.

FIG. 4 illustrates a BGR circuit according to an embodiment of the present inventive concept.

Referring to FIG. 4, the BGR circuit 110 may generate a reference voltage $V_{REF}$ having a stable level regardless of PVT fluctuation. The BGR circuit 110 may include an operational amplifier (OPAMP), first to third PMOS transistors P1 to P3, third to sixth resistors R3 to R6, a first bipolar junction transistor (BJT) Q1, and a second BJT Q2. A size of the second BJT Q2 may be N times a size of the first BJT Q1.

The first PMOS transistor P1 may be connected between the power supply voltage AVDD and a first input terminal (−) of an operational amplifier OPAMP and include a gate connected to an output terminal of the operational amplifier OPAMP. The second PMOS transistor P2 may be connected between the power supply voltage AVDD and a second input terminal (+) of the operational amplifier OPAMP and include a gate connected to the output terminal of the operational amplifier OPAMP. The third PMOS transistor P3 may be connected between the power supply voltage AVDD and an output terminal OUT and include a gate connected to the output terminal of the operational amplifier OPAMP.

The gate of the first PMOS transistor P1, the gate of the second PMOS transistor P2, and the gate of the third PMOS transistor P3 are commonly connected to the output terminal of the operational amplifier OPAMP. The sizes of the first transistor P1 and the second PMOS transistor P2 may be the same, and a ratio of the size of the second PMOS transistor P2 and the size of the third PMOS transistor P3 may be 1:M. Here, M is a positive integer greater than 1.

The third resistor R3 may be connected between the first input terminal (−) of the operational amplifier OPAMP and the ground voltage, and the first BJT Q1 may be connected between the first input terminal (−) of the operational amplifier OPAMP and the ground voltage. The fourth resistor R4 and the second BJT Q2 may be connected in series between the second input terminal (+) of the operational amplifier OPAMP and the ground voltage. The fifth resistor R5 may be connected between the second input terminal (+) of the operational amplifier OPAMP and the ground voltage, and the sixth resistor R6 may be connected between the output terminal OUT and the ground voltage.

Since the first transistor P1 and the second PMOS transistor P2 have the same size and the gate of the first transistor P1 and the gate of the second PMOS transistor P2 are commonly connected to the output terminal of the operational amplifier OPAMP, a first current I1 flowing through the first PMOS transistor P1 and a second current I2 flowing through the second PMOS transistor P2 may be substantially the same.

Turn-on degrees of the first PMOS transistor P1 and the second PMOS transistor P2 may change according to an output voltage of the operational amplifier OPAMP. Accordingly, the amounts of the first current I1 and the second current I2 may be adjusted. Such an operation continues until a level of a voltage VN at the first input terminal (−) of the operational amplifier OPAMP and a voltage VP at the second input terminal (+) of the operational amplifier OPAMP are the same.

The voltage VN at the first input terminal (−) of the operational amplifier OPAMP may be inversely proportional to temperature due to complementary to absolute temperature (CTAT) characteristics of a base-emitter voltage $V_{BE}$ of the first BJT Q1. Since the voltage VP at the second input terminal (+) of the operational amplifier OPAMP is the same as the voltage VN at the first input terminal (−) of the operational amplifier OPAMP, a current flowing through the fifth resistor R5 may have characteristics inversely proportional to an absolute temperature.

A level of a base-emitter voltage $V_{BEN}$ of the second BJT Q2 is also lowered as a temperature increases. Since a size of the second BJT Q2 is N times a size of the first BJT Q1, a variation of the base-emitter voltage $V_{BEN}$ of the second BJT Q2 according to a temperature is greater than a variation of the base-emitter voltage $V_{BE}$ of the first BJT Q1 according to a temperature. Here, N is a positive integer greater than 1. Accordingly, as the temperature increases, a voltage difference at both ends of the fourth resistor R4 may increase. Accordingly, a current flowing through the fourth resistor R4 may have characteristics proportional to the absolute temperature (PTAT).

PTAT characteristics of the current flowing through the fourth resistor R4 may be canceled by CTAT characteristics of a current flowing through the fifth resistor R5.

When a ratio of the size of the second PMOS transistor P2 and the size of the third PMOS transistor P3 is 1:M, a magnitude of a third current I3 flowing through the third PMOS transistor P3 may be M times a magnitude of a second current I2 flowing through the second PMOS transistor P2. When a level of the voltage VN at the first input terminal (−) of the amplifier OPAMP and a level of the voltage VP at the second input terminal (+) of the operational amplifier OPAMP are the same, the reference voltage VREF having a constant level may be applied to on the terminal OUT.

For example, the first PMOS transistor P1 connected between the power supply voltage AVDD and the first BJT Q1 has to operate in a saturation region. A drain-source voltage $V_{DS}$ of the first PMOS transistor P1 has to be sufficiently secured so that the first PMOS transistor P1 may operate in the saturation region. For example, if the drain-source voltage $V_{DS}$ of the first PMOS transistor P1 is lower than 10% of the power supply voltage AVDD, the first PMOS transistor P1 may not operate in the saturation region. In this case, a desirable voltage of the drain-source voltage $V_{DS}$ of the first PMOS transistor P1 may be 10% or less of the power supply voltage AVDD. The base-emitter voltage $V_{BE}$ of the BJT may increase to 0.9V in a low-temperature environment (for example, −55° C.) due to the CTAT characteristics, and thus, when the power supply voltage AVDD is lowered to 1V in the low-temperature environment, the drain-source voltage $V_{DS}$ of the first PMOS transistor P1 reaches the desirable voltage. Accordingly, the first PMOS transistor P1 may fail to operate in the saturation region. If the first PMOS transistor P1 fails to operate in the saturation region, a voltage gain of a loop formed by the first PMOS transistor P1 may be lowered. When the voltage gain of the loop formed by the first PMOS transistor P1 is lowered, the reference voltage $V_{REF}$ may have an unpredictable value. That is, if the power supply voltage AVDD continues to decrease in the low-temperature environment, the BGR circuit 110 may malfunction.

In the above, an embodiment in which the desirable voltage of the drain-source voltage $V_{DS}$ of the first PMOS transistor P1 is 10% or less of the power supply voltage AVDD has been described. However, this is only an example and the desirable voltage of the drain-source voltage $V_{DS}$ of the first PMOS transistor P1 may be set to be different.

The low-voltage attack detector according to an embodiment of the present inventive concept may include a BGR operation region detector outputting a malfunction detection flag signal having a high level in advance before the BGR circuit 110 malfunctions when the power supply voltage AVDD is lowered to a voltage level in a voltage region in which the BGR circuit 110 malfunctions in a low-temperature environment. Therefore, even if the BGR circuit 110 malfunctions, since the BGR operation region detector generates the malfunction detection flag signal $V_{BGRDET}$ having a high level, the same effect as that when the high level of the low voltage detection flag signal is maintained may be obtained.

Figure 5:
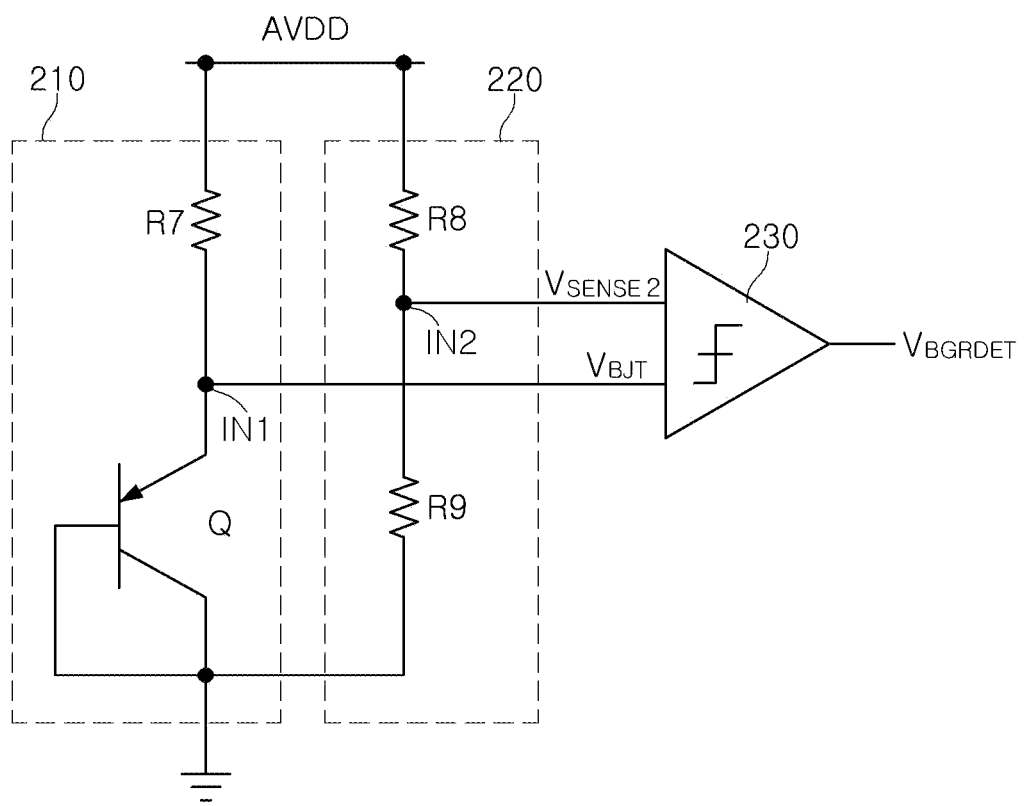
FIG. 5 illustrates a BGR operation region detector according to an embodiment of the present inventive concept.

FIG. 5 illustrates a BGR operation region detector according to an embodiment of the present inventive concept.

Referring to FIG. 5, the BGR operation region detector 200 according to an embodiment of the present inventive concept may include a BJT voltage generator 210, a second power supply voltage detection circuit 220, and a comparator 230. As described above with reference to FIG. 4, as the power supply voltage AVDD decreases, the drain-source voltage of the PMOS transistor P1 included in the BGR circuit decreases. When the drain-source voltage of the PMOS transistor P1 reaches the desirable voltage, the operation region of the PMOS transistor P1 is outside the saturation region. When the operation region of the PMOS transistor P1 is outside the saturation region, the BGR circuit may malfunction. For example, when the PMOS transistor P1 is outside the saturation region, the first current I1 flowing through the first PMOS transistor P1 may not flow linearly. The BGR operation region detector 200 may detect a decrease in the drain-source voltage of the PMOS transistor P1 included in the BGR circuit by detecting the decrease in the power supply voltage AVDD. Accordingly, the BGR operation region detector 200 may detect whether the drain-source voltage of the PMOS transistor P1 reaches a desirable voltage.

The BJT voltage generator 210 may include a seventh resistor R7 and a BJT Q connected in series between the power supply voltage AVDD and the ground voltage. The BJT voltage generator 210 may output a base-emitter voltage $V_{BJT}$ of the BJT Q based on the power supply voltage AVDD. The BJT voltage generator 210 may include the seventh resistor R7 instead of a transistor (e.g., the PMOS transistor P1 in FIG. 4)). The seventh resistor R7 may allow a current to flow linearly based on the power supply voltage AVDD and the base-emitter voltage $V_{BJT}$ of the BJT Q ($V_{IN1}$). For example, the base-emitter voltage $V_{BJT}$ of the BJT Q may maintain at a predetermined level based on a current flowing through the seventh resistor R7.

The second power supply voltage detection circuit 220 may output a second detection voltage $V_{SENSE2}$ based on the power supply voltage AVDD. For example, the second power supply voltage detection circuit 220 may include an eighth resistor R8 and a ninth resistor R9 connected in series between the power supply voltage AVDD and the ground voltage, and the second power supply voltage detection circuit 220 may generate the second detection voltage $V_{SENSE2}$ by resistance-dividing the power supply voltage AVDD.

For example, in the BGR circuit 110, if the drain-source voltage of the PMOS transistor is equal to or lower than 10% of the power supply voltage AVDD, the BGR circuit 110 may malfunction. The BGR operation region detector 200 may detect a decrease in the power supply voltage AVDD and detect a case in which the drain-source voltage of the PMOS transistor included in the BGR circuit 110 is lower than 10% of the power supply voltage AVDD. The drain-source voltage of the PMOS transistor included in the BGR circuit 110 may correspond to a difference between the power supply voltage AVDD and the base-emitter voltage $V_{BE}$ of the BJT Q in the BGR operation region detector 200. As described above in FIG. 4, since the base-emitter voltage $V_{BE}$ of the BJT Q increases to 0.9V in a low-temperature environment, the drain-source voltage of the PMOS transistor P1 may be 100 mV when the power supply voltage AVDD is 1V in the BGR circuit 110. If the drain-source voltage of the PMOS transistor P1 is equal to or lower than 100 mV, the BGR circuit 110 may malfunction. Therefore, when a ratio of a size of the eighth resistor R8 and a size of the ninth resistor R9 in the BGR operation region detector 200 is 1:9, the BGR operation region detector 200 may detect a decrease in the power supply voltage AVDD and detect a case in which the drain-source voltage of the PMOS transistor P1 included in the BGR circuit 110 is equal to or lower than 10% of the power supply voltage AVDD. The ratio of the size of the eighth resistor R8 and the size of the ninth resistor R9 may vary according to a drain-source voltage of the PMOS transistor P1 to be detected.

The comparator 130 may include a first input terminal connected to a first node IN1 between the seventh resistor R7 and the BJT Q and a second input terminal connected to a second node IN2 between the eighth resistor R8 and the ninth resistor R9. The comparator 130 may receive the base-emitter voltage $V_{BJT}$ of the BJT Q from the BJT voltage generator 210 through the first input terminal and may receive the second detection voltage $V_{SENSE2}$ from the second power supply voltage detection circuit 220 through the second input terminal. The comparator 130 may compare the base-emitter voltage $V_{BJT}$ of the BJT Q to the second detection voltage $V_{SENSE2}$, and when the base-emitter voltage $V_{BJT}$ of the BJT Q reaches the second detection voltage $V_{SENSE2}$, the comparator 130 may output a malfunction detection flag signal $V_{BGRDET}$ having a high level. For example, in a low-temperature environment, when the base-emitter voltage $V_{BJT}$ of BJT Q increases to 0.9V and the power supply voltage AVDD decreases to 1V, the base-emitter voltage $V_{BJT}$ of BJTQ and the reference voltage $V_{REF}$ from the BGR circuit 110 is 0.9V, respectively.

Accordingly, the comparator 130 may output a malfunction detection flag signal $V_{BGRDET}$ having a high level.

The BGR operation region detector 200 may output a malfunction detection flag signal $V_{BGRDET}$ having a high level in advance before the BGR circuit malfunctions. For example, even if the low voltage detector 100 cannot maintain the high level of the low voltage detection flag signal $V_{LVDET}$, the BGR operation region detector 200 may output the malfunction detection flag signal $V_{BGRDET}$ having a high level. Therefore, even if the BGR circuit 110 malfunctions, the same effect as continuously maintaining the high level of the low voltage detection flag signal $V_{BGRDET}$ may be obtained.

However, if the power supply voltage AVDD is continuously lowered in a low-temperature environment, a bias circuit of an analog circuit such as an operational amplifier or a comparator may not operate normally. For example, if the power supply voltage AVDD continues to decrease in the low-temperature environment, the bias circuit of the comparator included in the BGR operation region detector 200 may malfunction and the BGR operation region detector 200 may malfunction. Accordingly, even if the voltage region in which the BGR circuit 110 malfunctions is covered using the BGR operation region detector 200, it may not be able to maintain the high level of the low voltage detection flag signal in the voltage region in which another analog circuit malfunctions.

In addition, since a threshold voltage of a transistor decreases as a temperature increases, a voltage at which an analog circuit malfunctions may decrease. For example, in a high-temperature environment (e.g., 150° C.), a voltage at which the BGR circuit 110 malfunctions may be lowered. However, in a high-temperature environment, the low voltage detector 100 may malfunction because the bias circuit of the operational amplifier included in the BGR circuit 110 does not operate normally rather than due to the effect of the base-emitter voltage $V_{BE}$ of the BJT Q1 included in the BGR circuit 110. Accordingly, in a voltage region in which the analog circuit malfunctions, it may not be possible to maintain the high level of the low voltage detection flag signal $V_{BGRDET}$.

The low voltage attack detector according to an embodiment of the present inventive concept may include a power on reset (POR) circuit capable of detecting a region in which an analog circuit malfunctions at the entire temperatures. Accordingly, the effect that the high level of the low voltage detection flag signal is continuously maintained in the entire low voltage region may be provided.

Figure 6:
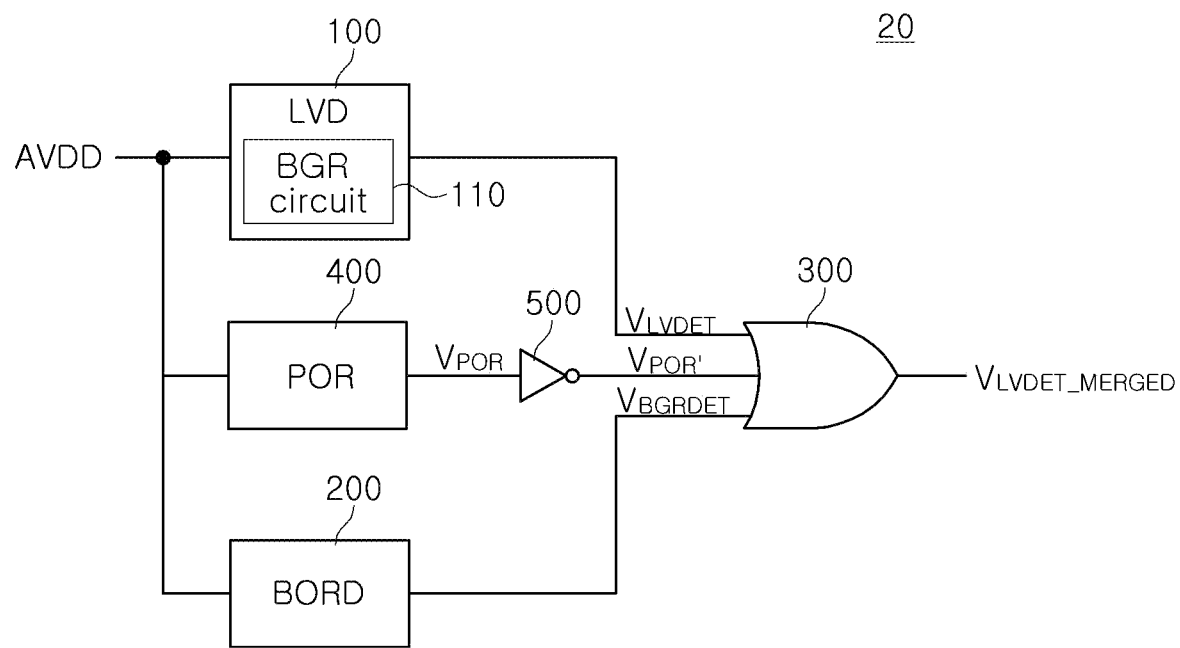
FIG. 6 illustrates a low voltage attack detector according to an embodiment of the present inventive concept.

FIG. 6 illustrates a low voltage attack detector according to an embodiment of the present inventive concept.

Referring to a difference from FIG. 1, a low voltage attack detector 20 of FIG. 6 may further include a POR circuit 400 and an inverter 500. The POR circuit 400 may output a first POR signal $V_{POR}$, and the inverter 500 may output a second POR signal $V_{POR'}$ by inverting a level of the first POR signal $V_{POR}$. The second POR signal $V_{POR'}$ may be input to the logic gate 300. The POR circuit 400 outputs a reset signal when the power supply voltage AVDD is lower than a predetermined voltage so that the system maintains a reset state, and when the power supply voltage AVDD is equal to or higher than the predetermined voltage, the system may operate normally.

As described above, when the power supply voltage AVDD reaches the target voltage, the low voltage detector 100 may output a low voltage detection flag signal $V_{LVDET}$ having a high level. However, in a low-temperature environment, when the power supply voltage AVDD is lowered to a voltage level in a voltage region in which the BGR circuit 110 may malfunction, the high level of the low voltage detection flag signal $V_{LVDET}$ may not be maintained.

The BGR operation region detector 200 may detect a decrease in the power supply voltage AVDD in a low-temperature environment to detect whether the operation region of the PMOS transistor of the BGR circuit 110 is outside a saturation region. Accordingly, the BGR operation region detector 200 may detect whether the power supply voltage AVDD reaches a voltage level in the voltage region in which the BGR circuit 110 malfunctions, and may output a malfunction detection flag signal $V_{BGRDET}$ having a high level before the BGR circuit 110 malfunctions. Even if the level of the low voltage detection flag signal $V_{LVDET}$ decreases to be low, the BGR operation region detector 200 may output the malfunction detection flag signal $V_{BGRDET}$ having a high level, and thus, a final low voltage detection flag signal $V_{LVDET\_MERGED}$ having a high level may be output through the logic gate 300. Accordingly, even if the BGR circuit 110 malfunctions, the same effect as continuously maintaining the high level of the low voltage detection flag signal $V_{LVDET}$ may be obtained.

However, when the level of the power supply voltage AVDD decreases to a voltage level in the voltage region in which the bias circuit of the comparator included in the BGR operation region detector 200 does not operate normally in a low-temperature environment, the BGR operation region detector 200 may malfunction. In addition, even in a high-temperature environment, if the level of the power supply voltage AVDD decreases to a voltage level in the voltage region in which the bias circuit of the operational amplifier included in the BGR circuit 110 does not operate normally, the low voltage detector 100 may malfunction. Accordingly, the low voltage attack detector 20 according to an embodiment of the present inventive concept may generate the second POR signal $V_{POR'}$ having a high level before the analog circuit malfunctions at the entire temperatures. A voltage at which the first POR signal $V_{POR}$ has a low level may be adjusted by changing the size of a resistor and a transistor included in the POR circuit 400.

The POR circuit 400 may output the first POR signal $V_{POR}$ having a low level when the power supply voltage AVDD reaches a voltage level in a voltage region in which the analog circuit malfunctions. The inverter 500 may output the second POR signal $V_{POR'}$ having a high level by inverting the low level of the first POR signal $V_{POR}$.

Even if the level of the low voltage detection flag signal $V_{LVDET}$ falls to a low level, the POR circuit 400 may output the second POR signal $V_{POR'}$ having a high level through the inverter 500, so that a final low voltage detection flag signal $V_{LVDET\_MERGED}$ having a high level may be output through the logic gate 300. Accordingly, even if the analog circuits malfunction, the same effect as continuously maintaining the high level of the low voltage detection flag signal $V_{LVDET}$ may be obtained.

Figure 7:
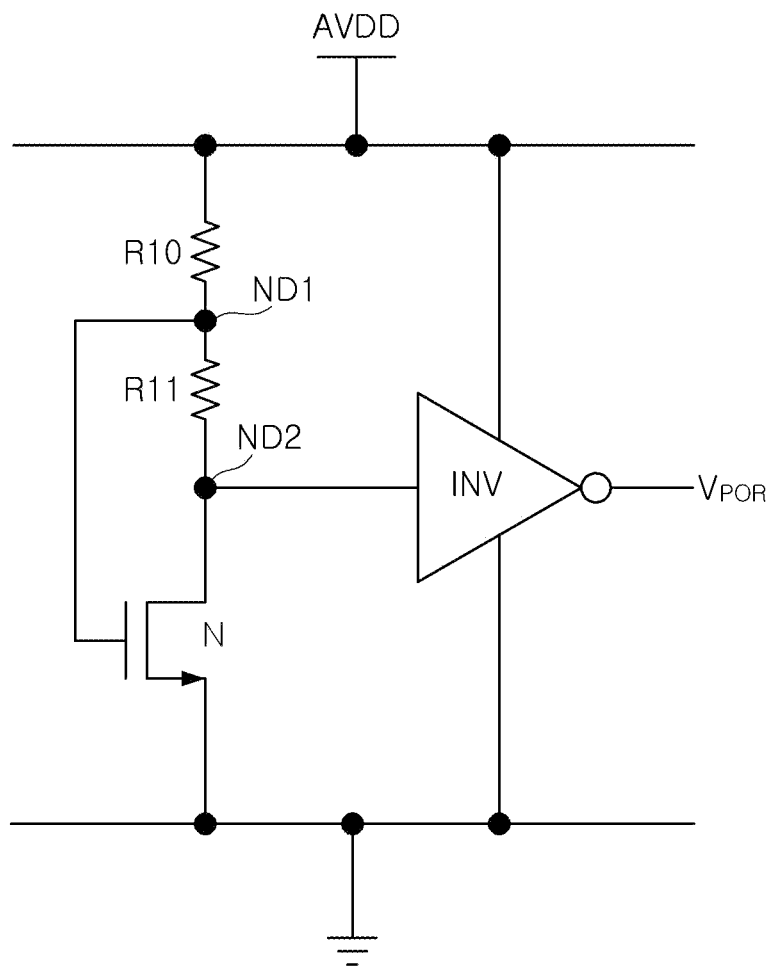
FIG. 7 illustrates a power on reset (POR) circuit according to an embodiment of the present inventive concept.
Figure 8:
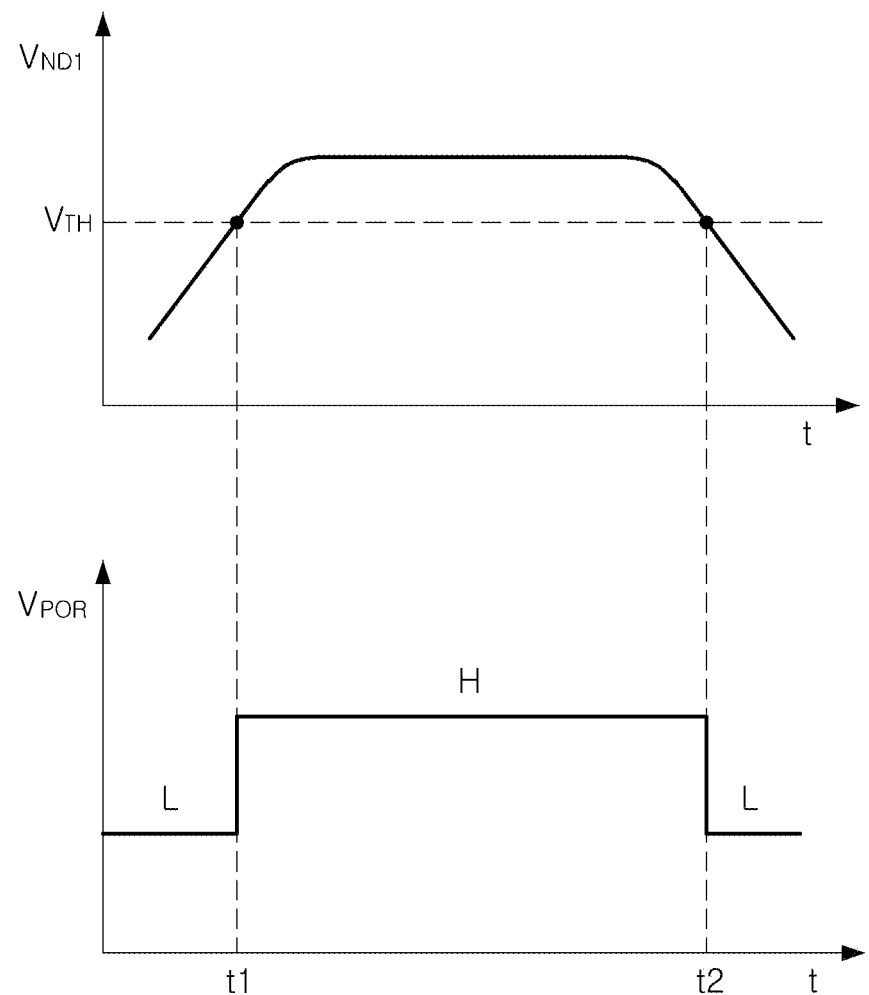
FIG. 8 illustrates operation waveforms of a POR circuit according to an embodiment of the present inventive concept.

FIG. 7 illustrates a POR circuit according to an embodiment of the present inventive concept, and FIG. 8 illustrates operation waveforms of a POR circuit according to an embodiment of the present inventive concept.

Referring to FIG. 7, the POR circuit 400 may include a tenth resistor R10, an eleventh resistor R11, an NMOS transistor N, and an inverter INV The tenth resistor R10, the eleventh resistor R11, and the NMOS transistor N may be connected in series between the power supply voltage AVDD and the ground voltage. A gate of the NMOS transistor N may be connected to a first node ND1 between the tenth resistor R10 and the eleventh resistor R11. An input terminal of the inverter INV may be connected to a second node ND2 between the eleventh resistor R11 and the NMOS transistor N to receive a voltage from the second node ND2. The inverter INV may invert the voltage from the second node ND2 and output an inverted voltage.

When the power supply voltage AVDD is very low, a gate voltage of the NMOS transistor N may be lower than a threshold voltage (e.g., a threshold voltage $V_{LTH}$ in FIG. 8). Accordingly, when the gate voltage of the NMOS transistor N is lower than the threshold voltage, the NMOS transistor N may be turned off. When the NMOS transistor N is turned off, current may not flow through the tenth resistor R10 and the eleventh resistor R11. Accordingly, the voltage of the first node ND1 follows the power supply voltage AVDD.

The power supply voltage AVDD may gradually increase so that a current may flow through the tenth resistor R10 and the eleventh resistor R11. When a current flows through the tenth resistor R10 and the eleventh resistor R11, the voltage at the second node ND2 may gradually decrease and the voltage at the first node ND1 may gradually increase. When the gate voltage of the NMOS transistor N is greater than the threshold voltage, the NMOS transistor N may be turned on. When the NMOS transistor N is turned on, the voltage at the second node ND2 may drop to the ground voltage.

As shown in FIG. 8, when the power supply voltage AVDD increases, a voltage $V_{ND1}$ at the first node ND1 may reach a threshold voltage $V_{TH}$ of the NMOS transistor N at a time point t1 and continue to follow the power supply voltage AVDD. When the voltage $V_{ND1}$ of the first node ND1 reaches the threshold voltage $V_{TH}$ of the NMOS transistor N, the NMOS transistor N may be turned on. The voltage $V_{ND2}$ at the second node ND2 may decrease to a logic threshold voltage of the inverter INV and the inverter INV may output the first POR signal $V_{POR}$ having a high level 'H' based on the logic threshold voltage of the inverter INV.

Conversely, when the power supply voltage AVDD decreases, the voltage $V_{ND1}$ at the first node ND1 may reach the threshold voltage $V_{TH}$ of the NMOS transistor N at a time point t2 and continue to follow the power supply voltage AVDD. When the voltage $V_{ND1}$ of the first node ND1 reaches a voltage level lower than the threshold voltage $V_{TH}$ of the NMOS transistor N, the NMOS transistor N may be turned off. The voltage $V_{ND2}$ at the second node ND2 may increase to the logic threshold voltage of the inverter INV and the inverter INV may output the first POR signal $V_{POR}$ having a low level 'L' based on the logic threshold voltage of the inverter INV.

The logic threshold voltage may refer to a threshold voltage of an input signal capable of transitioning a level of an output signal of an inverter. For example, when the input signal of the inverter has a voltage level greater than a first level, the output of the inverter has a low level, and when the input signal of the inverter has a voltage level lower than the first level, the output of the inverter has a high level. In this case, the logic threshold voltage of the inverter may have the first level and may be variable based on a level of the power supply voltage.

The power supply voltage at which the level of the first POR signal $V_{POR}$ is high may be adjusted by changing the size of a resistor and a transistor.

Meanwhile, the analog circuit may operate normally only when an appropriate bias is applied and the transistors operate in the saturation region. The POR circuit 400 is a logic, and transistors constituting the logic may operate well even if they are not in the saturation region. For example, the POR circuit 400 is a detection circuit that does not need a bias. However, the POR circuit 400 is highly influenced by a threshold voltage of a transistor and thus has a large distribution. Therefore, before the power supply voltage AVDD reaches a reliability region of the POR circuit 400, the BGR circuit may malfunction. Accordingly, in a low-temperature environment, the BGR operation region detector may cover a malfunction voltage region of the BGR circuit, and the POR circuit 400 may cover a voltage region in which the BGR operation region detector malfunctions. In the low-temperature environment, the POR circuit 400 may detect whether the power supply voltage AVDD reaches a voltage level in the voltage region in which the BGR operation region detector 200 malfunctions, by detecting whether the bias circuit of the analog circuit included in the BGR operation region detector 200 operates normally.

For example, as a temperature increases, a reliability region of the BGR operation region detector may gradually decrease and a reliability region of the POR circuit 400 may gradually increase. Therefore, in a high-temperature environment, the POR circuit 400 may cover a voltage region in which the low voltage detector malfunctions. The POR circuit 400 may detect whether the power supply voltage AVDD reaches a voltage level in a voltage region in which the low voltage detector malfunctions by detecting whether the bias circuit of the analog circuit included in the low voltage detector operates normally. The voltage region in which the POR circuit 400 malfunctions may be determined by a threshold voltage distribution range of the NMOS transistor included in the POR circuit 400.

Figure 9:
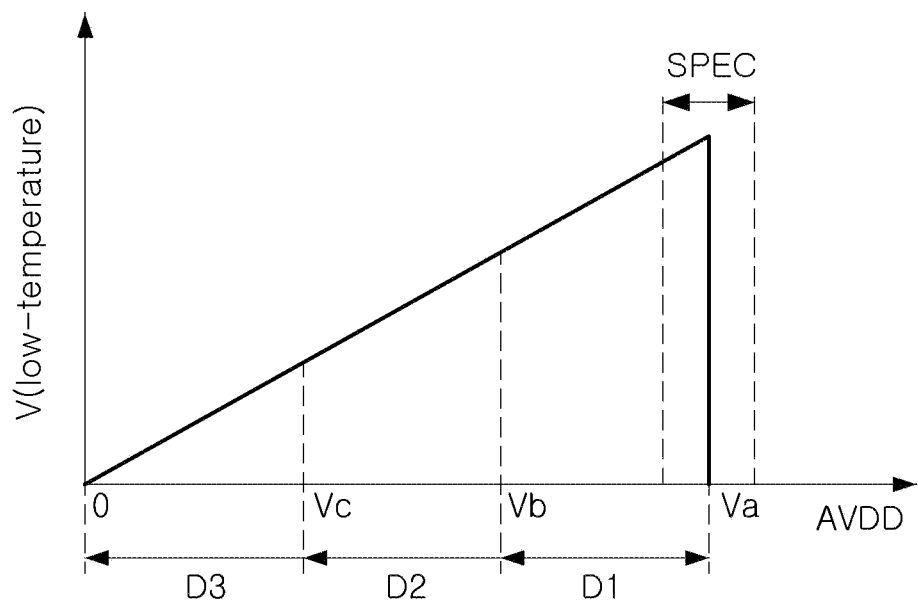
FIGS. 9 and 10 are graphs illustrating a guaranteed region of a low voltage attack detector according to an embodiment of the present inventive concept.
Figure 10:
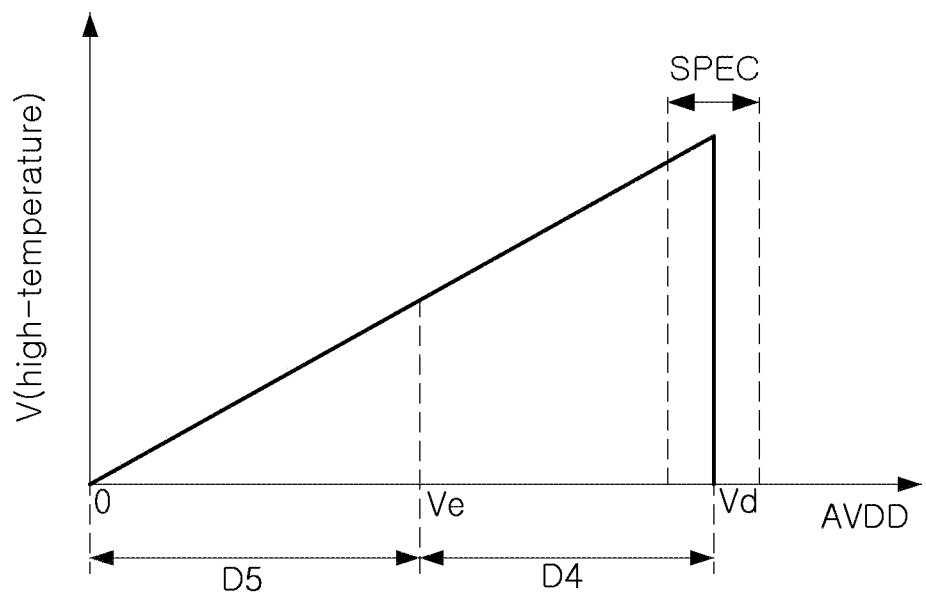

FIGS. 9 and 10 are graphs illustrating a reliability region of a low voltage attack detector according to an embodiment of the present inventive concept. In the graphs of FIGS. 9 and 10, the X-axis represents the power supply voltage AVDD and the Y-axis represents flag voltages that the low voltage detector, the BGR operation region detector, and the POR circuit output in corresponding reliability regions. For example, the flag voltages may be the final low voltage detection flag signal $V_{LVDET\_MERGED}$. Levels of the flag voltages may vary according to the power supply voltage AVDD.

FIG. 9 is a graph illustrating a reliability region of a low voltage attack detector in a low-temperature environment.

Referring to FIGS. 6 and 9 together, the low voltage detector 100 may output a low voltage detection flag signal $V_{LVDET}$ having a high level when the power supply voltage AVDD is within a low voltage detection specification range SPEC. For example, when the power supply voltage AVDD is a first voltage Va, the low voltage detector 100 may output a low voltage detection flag signal $V_{LVDET}$ having a high level. The low voltage detection flag signal $V_{LVDET}$ has to be able to maintain the high level even if the power supply voltage AVDD continues to decrease.

However, when the power supply voltage AVDD is lower than a second voltage Vb in a low-temperature environment, the BGR circuit 110 may malfunction. A first section D1 in which the power supply voltage AVDD falls within a first range from the first voltage Va to the second voltage Vb may be defined as a first reliability region in which the low voltage detection flag signal $V_{LVDET}$ output from the low voltage detector 100 maintains the high level. Since the BGR circuit 110 operates normally in the first reliability region, a final low voltage detection flag signal $V_{LVDET\_MERGED}$ may maintain a high level by the low voltage detection flag signal $V_{LVDET}$.

When the power supply voltage AVDD is lower than the second voltage Vb in the low-temperature environment, for example, when the power supply voltage AVDD is outside the first reliability region of the low voltage detector 100, the BGR operation region detector 200 may output a malfunction detection flag signal $V_{BGRDET}$ having a high level. Accordingly, regardless of whether the low voltage detection flag signal $V_{LVDET}$ maintains the high level, the final low voltage detection flag signal $V_{LVDET\_MERGED}$ may maintain the high level by the malfunction detection flag signal $V_{BGRDET}$.

When the power supply voltage AVDD is lower than a third voltage Vc in the low-temperature environment, the BGR operation region detector 200 may malfunction. A second section D2 in which the power supply voltage AVDD falls within a second range from the second voltage Vb to a third voltage Vc may be defined as a second reliability region in which the malfunction detection flag signal $V_{BGRDET}$ output from the BGR operation region detector 200 may maintain the high level. Since the BGR operation region detector 200 operates normally in the second reliability region, a final low voltage detection flag signal $V_{LVDET\_MERGED}$ may maintain the high level by the malfunction detection flag signal $V_{BGRDET}$, regardless of whether the low voltage detection flag signal $V_{LVDET}$ maintains the high level.

When the power supply voltage AVDD is lower than the third voltage Vc in the low-temperature environment, for example, when the power supply voltage AVDD is outside the second reliability region of the BGR operation region detector, the POR circuit 400 may output a POR signal $V_{POR}$ having a low level. A third section D3 in which the power supply voltage AVDD falls within a third range from the third voltage Vc to 0V may be defined as a third reliability region in which the POR signal $V_{POR}$ output from the POR circuit 400 maintains a low level. Since the POR circuit 400 operates normally in the third reliability region, the final low voltage detection flag signal $V_{LVDET\_MERGED}$ may maintain the high level by the POR signal $V_{POR}$ having a low level 'L', regardless of whether the low voltage detection flag signal $V_{LVDET}$ maintains a high level.

FIG. 10 is a graph illustrating a reliability region of a low voltage attack detector in a high-temperature environment.

Referring to FIGS. 6 and 10 together, the low voltage detector 100 may output a low voltage detection flag signal $V_{LVDET}$ when the power supply voltage AVDD is within the low voltage detection specification range SPEC. For example, when the power supply voltage AVDD is a fourth voltage Vd, the low voltage detector 100 may output a low voltage detection flag signal $V_{LVDET}$ having a high level. The low voltage detection flag signal $V_{LVDET}$ has to be able to maintain the high level even if the power supply voltage AVDD continues to decrease.

When a temperature increases, the voltage at which the low voltage detector 100 malfunctions may be lowered, but when the power supply voltage AVDD is lower than a fifth voltage Ve, the bias circuit of the operational amplifier included in the BGR circuit 110 may malfunction. In the high-temperature environment, a fourth section D4 in which the power supply voltage AVDD falls within a fourth range from the fourth voltage Vd to the fifth voltage Ve may be defined as a fourth reliability region in which the low voltage detection flag signal $V_{LVDET}$ maintains a high level. Since the BGR circuit 110 operates normally in the fourth reliability region, the final low voltage detection flag signal $V_{LVDET\_MERGED}$ may maintain the high level by the low voltage detection flag signal $V_{LVDET}$ having a high level 'H'.

When the power supply voltage is lower than the fifth voltage Ve in the high-temperature environment, for example, when the power supply voltage is outside the fourth reliability region of the low voltage detector 100, the POR circuit 400 may output a POR signal $V_{POR}$ having a low level 'L'. Accordingly, regardless of whether the low voltage detection flag signal $V_{LVDET}$ maintains the high level, the final low voltage detection flag signal $V_{LVDET\_MERGED}$ may maintain the high level by the POR signal $V_{POR}$ having a low level 'L'.

As the temperature increases, the reliability region of the BGR operation region detector gradually decreases, the reliability region of the POR circuit 400 gradually increases, and the POR circuit 400 does not malfunction to 0V, so in the high-temperature environment, the POR circuit 400 may cover all the malfunction regions of the low voltage detector 100. In the high-temperature environment, a fifth section D5 in which the power supply voltage AVDD falls within a fifth range from the fifth voltage Ve to 0V may be defined as a fifth reliability region in which the POR signal $V_{POR}$ may maintain a low level. The fifth reliability region may be determined by a threshold voltage distribution range of the NMOS transistor included in the POR circuit 400. According to an embodiment, at room temperature (e.g., 25° C.), the BGR operation region detector 200 and the POR circuit 400 may complement each other in order to cover the malfunction region of the low voltage detector 100.

In example embodiments, a sixth section D6 between the fourth section D4 and the fifth section D5 may be disposed. The sixth section D6 (not shown) in which the power supply voltage AVDD falls to a voltage level within a sixth range from the fifth voltage Ve to a sixth voltage Vf (not shown) may be defined as a sixth reliability region in which the malfunction detection flag signal $V_{BGRDET}$ output from the BGR operation region detector 200 may maintain the high level. Since the BGR operation region detector 200 operates normally in the sixth reliability region, the final low voltage detection flag signal $V_{LVDET\_MERGED}$ may maintain the high level by the malfunction detection flag signal $V_{BGRDET}$, regardless of whether the low voltage detection flag signal $V_{LVDET}$ maintains the high level.

Figure 11:
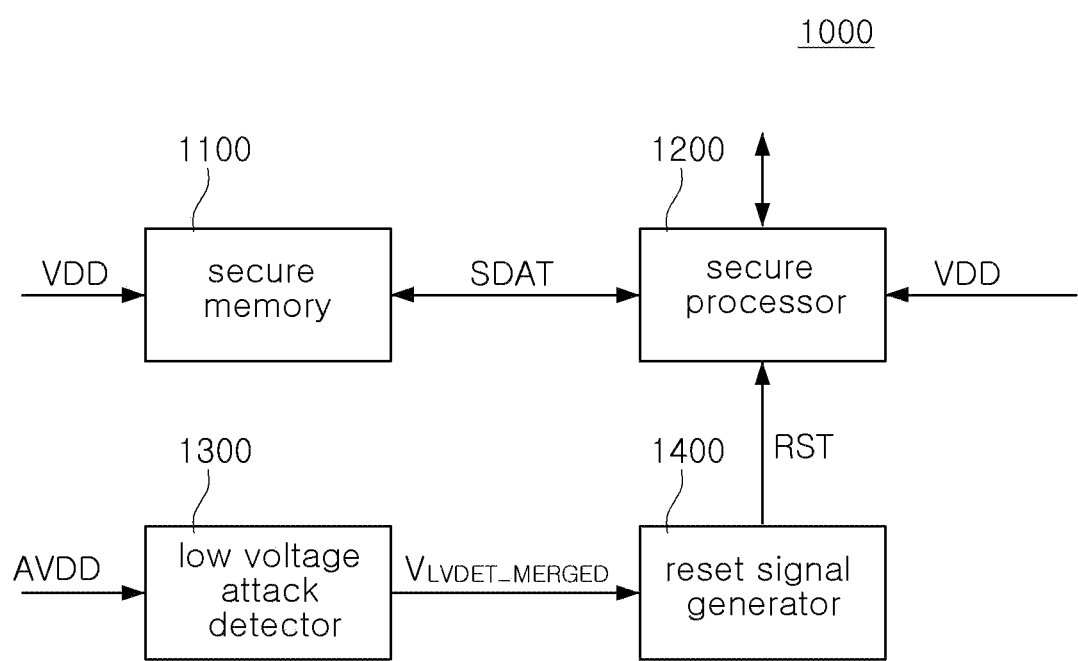
FIG. 11 is a block diagram illustrating a secure element according to an embodiment of the present inventive concept.

FIG. 11 is a block diagram illustrating a secure element according to an embodiment of the present inventive concept.

Referring to FIG. 11, the secure element 1000 may include a secure memory 1100, a secure processor 1200, a low voltage attack detector 1300, and a reset signal generator 1400. For example, the secure element 1000 may be a smart card, a secure element (SE), or the like.

The secure memory 1100 stores secure data SDAT, and the secure processor 1200 processes secure data SDAT. For example, the secure processor 1200 may write secure data SDAT in the secure memory 1100 and read secure data SDAT from the secure memory 1100. For example, the secure data SDAT may include a cryptographic key, sensitive data, a key code, and the like. For example, the secure memory 1100 and the secure processor 1200 may operate based on a power supply voltage VDD. However, the disclosure is not limited thereto. For example, the secure memory 1100 and the secure processor 1200 may be provided the power supply voltage AVDD. For example, the power supply voltage VDD may be generated based on the power supply voltage AVDD. In an embodiment, a voltage level of the power supply voltage AVDD may be higher than a voltage level of the power supply voltage VDD.

In an embodiment, the secure memory 1100 may include a non-volatile memory such as an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM) and/or a volatile memory such as a dynamic random access memory (DRAM) and a static random access memory (SRAM).

In an embodiment, the secure processor 1200 may include any processing device such as a central processing unit (CPU), a microprocessor, or the like.

In an embodiment, the secure element 1000 may have a tamper-resistant function so as to be protected from a tampering attack such as microprobing, software attack, eavesdropping, fault injection, etc.

Microprobing may be used to directly access a chip surface. Software attacks may use a processor's general communication interface and may take advantage of security vulnerabilities, cryptographic algorithms, or algorithm executions that occur in a protocol. Eavesdropping may measure analog characteristics of all supply and interface connections and electromagnetic radiation generated by a processor during a normal operation. Error injection may create malfunction of a processor that provides additional access using abnormal environmental conditions. Microprobing is a direct invasive attack technique and requires a lot of time. The other techniques are non-invasive attack techniques.

As an indirect attack technique, a voltage change indicates hacking the secure element 1000 by abnormally changing a signal or power applied from the outside so that the secure element 1000 operates unpredictably. For example, a method of leaking the secure data SDAT from the secure memory 1100 by abnormally changing a voltage (e.g., the power supply voltage AVDD) for driving internal components of the secure element 1000 may be attempted.

The low voltage attack detector 1300 may output a final low voltage detection flag signal $V_{DET\_MERGED}$ having a high level when the power supply voltage AVDD reaches a target voltage, and may maintain the high level of the final low voltage detection flag signal until the power supply voltage AVDD reaches 0V. The low voltage attack detector 1300 may be the low voltage attack detector previously described according to embodiments of the present inventive concept, and may be implemented as described above with reference to FIGS. 1 to 10. The low voltage attack detector 1300 may detect a low voltage even if the power supply voltage AVDD reaches a voltage level in a voltage region in which the analog circuit malfunctions.

The reset signal generator 1400 generates a reset signal RST based on the final low voltage detection flag signal $V_{DET\_MERGED}$. The reset signal RST is provided to the secure processor 1200, and the secure processor 1200 is reset based on the reset signal RST. Accordingly, the secure element 1000 may protect the secure data SDAT from leakage, destruction, or alteration of the secure data SDAT caused by an external attack, and security performance of the secure element 1000 may be improved.

For example, in FIG. 11, it is illustrated that the reset signal RST is provided only to the secure processor 1200, but the present inventive concept may not be limited thereto. For example, the reset signal RST may be provided to the secure memory 1100 as well, and the secure memory 1100 may also be reset based on the reset signal RST.

Figure 12:
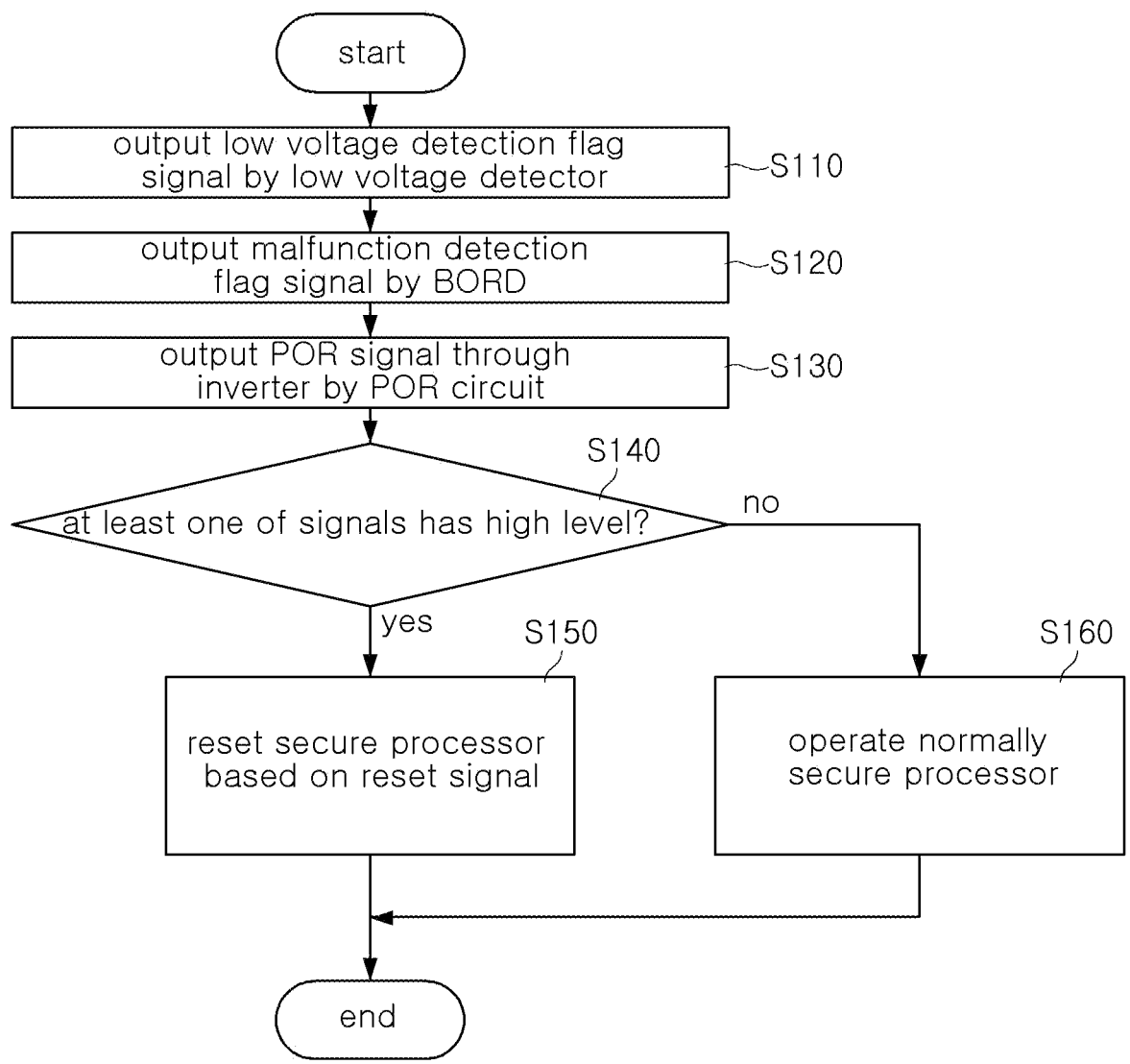
FIG. 12 is a flowchart illustrating a method of operating a secure element according to embodiments of the present inventive concept.

FIG. 12 is a flowchart illustrating a method of operating a secure element according to embodiments of the present inventive concept.

Referring to FIGS. 11 and 12, when the power supply voltage AVDD reaches the target voltage, the low voltage detector may output a low voltage detection flag signal having a high level in operation S110.

When the power supply voltage AVDD is lowered to a voltage at which the BGR circuit malfunctions in a low-temperature environment, the BGR operation region detector may output a malfunction detection flag signal having a high level in operation S120. In the high-temperature environment, when the power supply voltage AVDD is lowered to the voltage at which the BGR circuit malfunctions, the POR circuit may output a POR signal having a high level through an inverter in operation S130.

When the power supply voltage AVDD is lowered to a voltage at which the BGR operation region detector malfunctions in a low-temperature environment, the POR circuit may output the POR signal having a high level through an inverter in operation S130.

The logic gate (e.g., OR gate) may receive the low voltage detection flag signal, the malfunction detection flag signal, and the POR signal through an inverter (i.e., the second POR signal $V_{POR'}$). If any of the low voltage detection flag signal, the malfunction detection flag signal, and the POR signal through the inverter has a high level (YES in operation S140), the low voltage attack detector 1300 may output a final low voltage detection flag signal $V_{LVDET\_MERGED}$ having a high level. Therefore, regardless of whether the low voltage detection flag signal maintains the high level, the final low voltage detection flag signal $V_{LVDET\_MERGED}$ may maintain the high level in the entire low voltage region.

The reset signal detector 1400 generates the reset signal RST based on the final low voltage detection flag signal $V_{DET\_MERGED}$. The secure processor 1200 may be reset based on the reset signal RST (S150). However, when the low voltage detection flag signal, the malfunction detection flag signal, and the POR signal through the inverter all have low levels (NO in operation S140), the secure processor 1200 may operate normally in operation S160.

Therefore, even if a hacker artificially applies a voltage that may cause a malfunction of an analog circuit, the system cannot operate normally, so an effect of preventing a hacker's attack may be obtained.

For example, the embodiments of the present inventive concept may be implemented in the form of a product including a computer-readable program code stored in a computer-readable medium. The computer-readable program code may be provided by processors of various computers or other data processing devices. The computer-readable medium may be a computer-readable signal medium or a computer-readable recording medium. The computer-readable recording medium may be any tangible medium that may store or contain a program in an instruction execution system, equipment, or device or may be connected thereto to store or contain a program. For example, the computer-readable medium may be provided in the form of a non-transitory storage medium. Here, non-transitory means that the storage medium does not contain a signal and is tangible, but does not distinguish that data is semi-permanently or temporarily stored in the storage medium.

Figure 13:
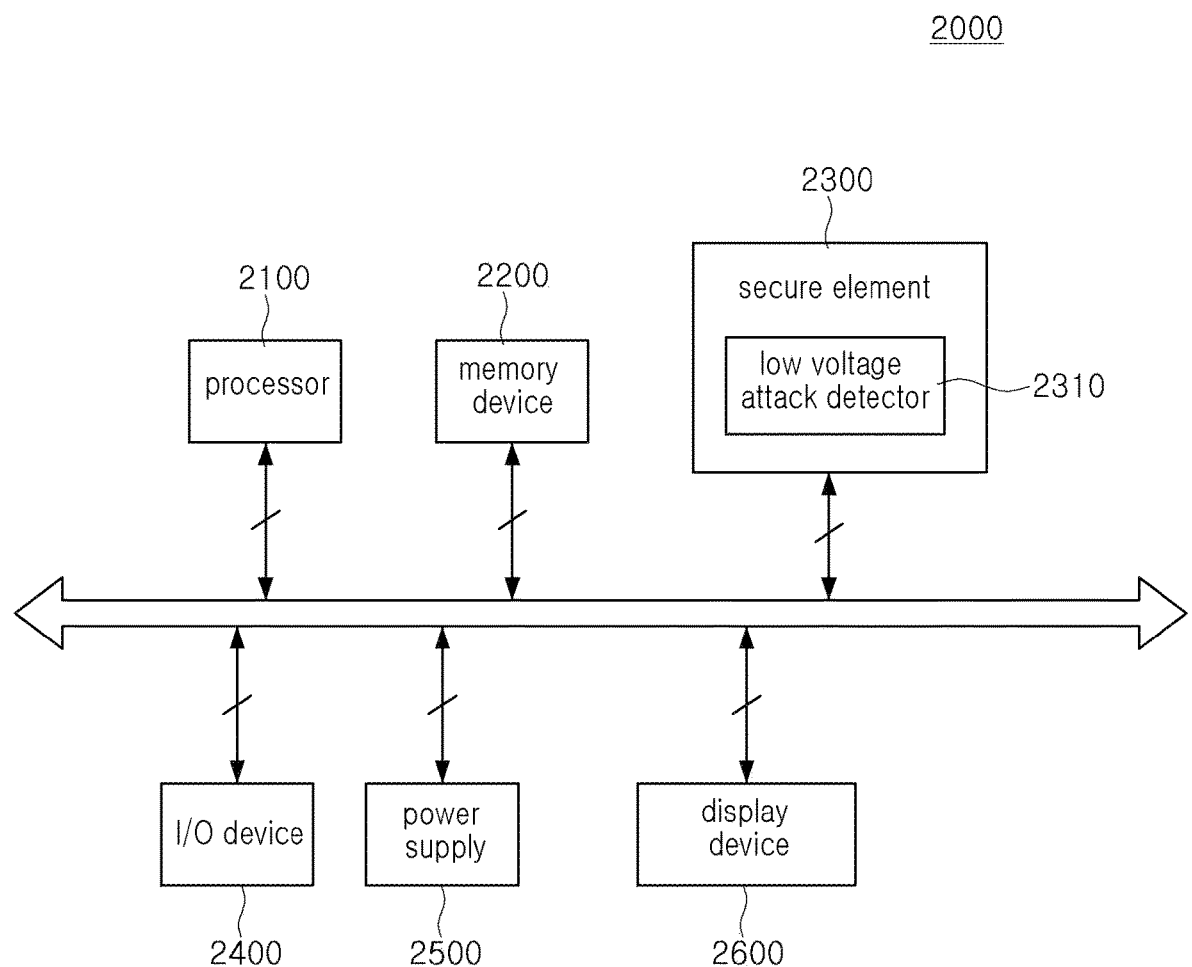
FIG. 13 is a block diagram illustrating an electronic system according to embodiments of the present inventive concept.

FIG. 13 is a block diagram illustrating an electronic system according to embodiments of the present inventive concept.

Referring to FIG. 13, the electronic system 2000 may include a processor 2100, a memory device 2200, a secure element 2300, an input/output device 2400, a power supply 2500, and a display device 2600. The electronic system 2000 may further include various ports capable of communicating with a video card, a sound card, a memory card, a USB device, or the like, or with other systems.

The processor 2100 may control an overall operation of the electronic system 2000 and execute an operating system, an application, and the like. The memory device 2200 may store data necessary for the operation of the electronic system 2000. The input/output device 2400 may include an input means such as a keyboard, a keypad, a touch pad, a touch screen, a mouse, and a remote controller, and an output means such as a speaker or a printer. The power supply 2500 may supply power required for the operation of the electronic system 2000. The display device 2060 may display an image.

The processor 2100 may control a normal operation, and the secure element 2300 may control a secure operation. The secure element 2300 may be a secure element according to embodiments of the present inventive concept, and may be implemented as described above with reference to FIGS. 11 and 12. The secure element 2300 may detect a low voltage in the entire low voltage regions even if a low voltage that may cause an analog circuit to malfunction is applied to the system.

The secure element 2300 may protect secure data from leakage, destruction, or alteration of secure data by an external attack, and security performance of the secure element 2300 and the electronic system 2000 including the same may be improved.

In an embodiment, the electronic system 2000 may be a security-related system, and the low voltage attack detector 2310 may be used as a detector for preventing hacking. In another embodiment, the electronic system 2000 may be a mobile system such as an application processor (AP) or a wearable device, and the low voltage attack detector 2310 may be used as a detector for preventing hacking which operates at low power. In another embodiment, the electronic system 2000 may be an automotive system, and the low voltage attack detector 2310 may be used as a safety related detector.

The embodiments of the present inventive concept may be advantageously used in any electronic device and system including a low voltage attack detector and a secure element. For example, the embodiments of the present inventive concept may be more usefully applied to a personal computer (PC), a server computer, a data center, a workstation, a laptop, a cellular phone, and a smartphone, an MP3 player, a personal digital assistant (PDA), a portable multimedia player (PMP), a digital TV, a digital camera, a portable game console, a navigation device, a wearable device, an Internet of things (IoT) device, an Internet of everything (IoE) device, e-book, a virtual reality (VR) device, an augmented reality (AR) device, a drone, an automotive, etc.

According to an embodiment of the present inventive concept, even if the level of the power supply voltage decreases to a voltage level in the voltage region in which the analog circuit malfunctions, the level of the low voltage detection flag signal is maintained, and thus, the system may not operate in the entire low voltage region. Therefore, even if a hacker artificially applies a voltage that may cause a malfunction of the analog circuit, the hacker's attack may be prevented.

Various and beneficial advantages and effects of the present inventive concept are not limited to the above description, and the present inventive concept will be more easily understood in the course of describing specific embodiments.

While example embodiments have been shown and described above, it will be apparent to those skilled in the art that modifications and variations could be made without departing from the scope of the present disclosure as defined by the appended claims.

What is claimed is:

1. A low voltage attack detector comprising:
  a low voltage detector including a bandgap reference (BGR) circuit and configured to output a low voltage detection flag signal having a high level when a first power supply voltage reaches a first voltage level using a bandgap reference (BGR) circuit;
  a BGR operation region detector configured to output a malfunction detection flag signal having a high level when the first power supply voltage reaches a second voltage level lower than the first voltage level; and
  a logic gate configured to output a final low voltage detection flag signal having a high level when at least one of the low voltage detection flag signal and the malfunction detection flag signal has a high level,
  wherein the BGR circuit includes a PMOS transistor and a first bipolar junction transistor (BJT) directly connected in series between the first power supply voltage and a second power supply voltage.

2. The low voltage attack detector of claim 1, wherein the BGR operation region detector is configured to output the malfunction detection flag signal having a high level when a drain-source voltage of the PMOS transistor reaches a third voltage.

3. The low voltage attack detector of claim 1, wherein the BGR operation region detector includes:
  a bipolar junction transistor (BJT) voltage generator including a first resistor and a second BJT connected in series between the first power supply voltage and the second power supply voltage and configured to output a base-emitter voltage of the second BJT;
  a power supply voltage detection circuit configured to generate a detection voltage; and
  a comparator configured to compare the base-emitter voltage of the second BJT to the detection voltage, and output the malfunction detection flag signal having a high level when the base-emitter voltage of the second BJT reaches the detection voltage.

4. The low voltage attack detector of claim 3, wherein:
  the power supply voltage detection circuit includes a second resistor and a third resistor connected in series between the first power supply voltage and the second power supply voltage, and
  a ratio of the second resistor to the third resistor is determined according to a drain-source voltage of the PMOS transistor.

5. The low voltage attack detector of claim 3, wherein the first resistor is configured to maintain the base-emitter voltage of the second BJT at a predetermined level.

6. The low voltage attack detector of claim 1, further comprising:
  a power on reset (POR) circuit configured to output a first POR signal having a low level when the first power supply voltage reaches a voltage level in a voltage region in which a bias circuit of an operational amplifier included in the BGR operation region detector does not operate normally.

7. The low voltage attack detector of claim 6, further comprising:
  an inverter configured to output a second POR signal by inverting a level of the first POR signal,
  wherein the logic gate is configured to output the final low voltage detection flag signal having a high level when at least one of the low voltage detection flag signal, the malfunction detection flag signal, and the second POR signal has a high level.

8. A low voltage attack detector comprising:
a low voltage detector configured to detect whether a first power supply voltage reaches a first voltage level using a bandgap reference (BGR) circuit in a first reliability region in which the first power supply voltage belongs to a first range, and output a low voltage detection flag signal having a high level when the first power supply voltage reaches the first voltage level;
a BGR operation region detector configured to output a malfunction detection flag signal having a high level in a second reliability region in which the first power supply voltage belongs to a second range; and
a power on reset (POR) circuit configured to output a first POR signal having a low level in a third reliability region in which the first power supply voltage belongs to a third range,
wherein each voltage level belonging to the first range is greater than each voltage level belonging to the second range, and each voltage level belonging to the second range is greater than each voltage level belonging to the third range.

9. The low voltage attack detector of claim 8, wherein the BGR circuit includes a PMOS transistor and a bipolar junction transistor (BJT) connected in series between the first power supply voltage and a second power supply voltage, and
wherein a drain-source voltage of the PMOS transistor reaches a second voltage in the second range.

10. The low voltage attack detector of claim 9, wherein the drain-source voltage of the PMOS transistor is a difference between a base-emitter voltage of the BJT and the first power supply voltage.

11. The low voltage attack detector of claim 8, wherein the third range is a range of voltage levels of the first power supply voltage in which a bias circuit of a comparator included in the BGR operation region detector does not operate normally.

12. The low voltage attack detector of claim 8, wherein, when a temperature increases:
the low voltage detector is configured to output the low voltage detection flag signal having a high level in a fourth reliability region belonging to a fourth range,
the POR circuit is configured to output the first POR signal having a low level in a fifth reliability region belonging to a fifth range, and
each voltage level belonging to the fourth range is greater than each voltage level belonging to the fifth range.

13. The low voltage attack detector of claim 12, wherein the fifth range is a range of the first power supply voltage in which a bias circuit of an operational amplifier included in the BGR circuit does not operate normally.

14. The low voltage attack detector of claim 12, wherein the POR circuit includes:
a first resistor, a second resistor, and an NMOS transistor connected in series between the first power supply voltage and a second power supply voltage; and
an inverter including an input terminal connected to a node between the second resistor and the NMOS transistor,
wherein the fifth reliability region is determined by a threshold voltage distribution range of the NMOS transistor.

* * * * *